United States Patent Office 2,882,306
Patented Apr. 14, 1959

2,882,306
PRODUCTION OF ORGANOPHOSPHORUS COMPOUNDS

Charles W. Weber, Jersey City, N.J., assignor to The M. W. Kellogg Company, Jersey City, N.J., a corporation of Delaware No Drawing. Application October 30, 1953
Serial No. 389,483

14 Claims. (Cl. 260—543)

This invention relates to a new and improved process for the production of organophosphorus compounds. In one aspect this invention relates to the production of organic phosphonyl halides and the corresponding phosphonic acids and derivatives derived therefrom. In another aspect this invention relates to the production of organic phosphine oxides. In a still more particular aspect this invention relates to the production of methane phosphonyl dichloride.

The organic phosphonyl halides and especially methane phosphonyl dichloride, as well as the organic phosphine oxides, are much in demand as intermediate chemical reactants for the production of more complex organic phosphorus compounds, such as the corresponding esters, free acids and amides by conventional methods, which are useful as fungicides, insecticides, pharmaceuticals, petroleum additives for improving lubricating oils and polymer additives. Prior to the present invention, relatively low molecular weight organic phosphonyl halides and phosphine oxides have been obtained by devious and round about methods involving numerous chemical and mechanical steps. Less involved methods for the production of organic phosphonyl halides, for example, are not applicable to the production of low molecular weight analogs in good yields. Methane phosphonyl dichloride is a particularly difficult compound to produce. For example, the reaction between methane, phosphorus trichloride and oxygen is a very poor reaction and produces methane phosphonyl dichloride in very low yield, although higher molecular weight alkanes, such as n-heptane react with phosphorus trichloride and oxygen to produce the corresponding alkane phosphonyl dichlorides in somewhat better yields.

It is therefore an object of the present invention to provide a new and improved process for producing organic phosphonyl halides and organic phosphine oxides.

Another object is to produce such organophosphorus compounds with the minimum formation of by-products and with the maximum utilization of reactants.

Still another object is to provide a novel direct method for the production of organic phosphonyl halides and organic phosphine oxides.

Still another object of this invention is to provide an effective and economical process by which such organo phosphorus compounds may be prepared in high yield with good selectivity.

Another object is to provide a new and improved catalyst for use in the production of organo phosphorus compounds.

A further object is to provide a direct method for the production of methane phosphonyl dichloride in high yield with good selectivity.

Various other objects and advantages of the present invention will become apparent to those skilled in the art from the accompanying description and disclosure.

In accordance with this invention organophosphorus compounds of the general formula $R_3P=O$ including organic phosphonyl dihalides, organic phosphonyl monohalides and organic phosphine oxides are produced by a process which comprises reacting under appropriate conditions an organic ether, an organic halide and a trivalent phosphorus halide in the presence of a catalyst mixture comprising iodine and a metal phosphorus trihalo complex. The R groups of the general formula for the organophosphorus compounds produced in accordance with this invention represent halogens (F, Cl, Br and I) and organic radicals and at least one R is an organic radical. Where more than one organic radical is included in the product, or more than one halogen is included in the product, these organic radicals and halogens may be the same or different.

The phosphorus trihalo complex of the catalyst mixture includes any metal phosphorus trihalo complex of the general formula $M(PX_3)_n$ where X is chlorine, bromine, iodine or fluorine and M is a metal selected from groups VI and VIII of the periodic table, such as chromium, iron, cobalt, nickel, molybdenum, ruthenium, rhodium, tungsten, rhenium, osmium and iridium and "$n$" is a number equal to at least twice the minimum valence of the metal involved.

Examples of such phosphorus trihalo complexes are: cobalt tetrakistrichlorophosphine, iron penta-trichlorophosphine, nickel tetrakistribromophosphine, nickel tetrakistrifluorophosphine, cobalt tetrakistribromophosphine and osmium penta-trichlorophosphine.

The metal phosphorus trihalo complexes may be prepared in a manner similar to the following as illustrated for nickel tetrakistrichlorophosphine. Nickel carbonyl is reacted with excess phosphorus trichloride by heating on a steam bath under reflux conditions. Excess $PCl_3$ is removed by distillation. The remainder is dissolved in pentane and cooled to $-60°$ C. in an atmosphere of carbon dioxide to precipitate the product.

It is within the scope of this invention to form the metal phosphorus trihalo complex in situ in the reaction zone by introducing the appropriate metal carbonyl with the reactants including phosphorus trihalide.

The use of the metal phosphorus trihalo complex materially reduces the amount of iodine required as a catalyst to obtain comparable yields of product. As a result the present process is cheaper with respect to both initial cost of catalyst and recovery and purification of product to free it from free iodine formed during the reaction.

Examples of suitable iodine-containing catalysts which may be used in accordance with this invention are: metal iodides, such as nickel iodide, zinc iodide, cobalt iodide, sodium iodide, aluminum iodide and manganese iodide; phosphorus iodides, such as phosphorus di-iodide and phosphorus tri-iodide; and free iodine.

The organic ethers to be employed in accordance with this invention are selected from the group consisting of the saturated unsubstituted and substituted alkyl ethers, including the acyclic and alicyclic alkyl ethers. The substituted alkyl ethers contain substituents selected from the group consisting of the halogens, nitro group, cyano group and aryl groups. It is preferable to employ ethers in which each of the organic radicals linked to the ether oxygen atom contains not more than 10 carbon atoms. Ethers which give satisfactory yields of product are the symmetrical ethers (R'-O-R') in which the organic radicals (R') are the same and correspond to the organic radicals of the final products. Typcial examples of the symmetrical ethers are dimethyl ether, diisopropyl ether, dibenzyl ether, alpha, alpha'-dichloro dimethyl ether, beta, beta'-oxy diproprio nitrile and beta, beta'-dinitro dipropyl ether. The ethers in which the organic radicals (R') linked to the oxygen atom are different may also be employed. When an unsymmetrical ether which is free of alpha halo substitution is used, the products are mixed products corresponding to the alkyl and cycloalkyl radicals of the ethers. Typical examples of such unsymmetrical ethers are methyl ethyl ether, ethyl benzyl ether, methyl cyclohexyl ether, propyl t-butyl ether and beta-chloroethyl benzyl ether. The mono-alpha halogenated ethers, such as those with the general formula

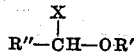

in which R″ is hydrogen or an alkyl radical and X is a halogen (F, Cl, Br and I) have been found to give high yields of organic phosphonyl halides

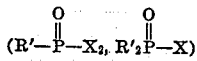

and organic phosphine oxides ($R'_3P=O$) when employed according to this invention. Typical examples of a few of such halogenated ethers are: chloromethyl methyl ether, iodomethyl methyl ether, alpha-fluoroethyl propyl ether, alpha-chloroethyl propyl ether, bromomethyl isoamyl ether, chloromethyl beta-chloroisopropyl ether and alpha-bromoethyl ethyl ether.

Other types of ethers may also be employed, examples of which are as follows: straight chain polyethers, such as dimethoxy methane and diethoxyethane, cyclic monoethers, such as tetrahydrofuran, and cyclic polyoxy ethers, such as dioxane and trioxane. Mixtures of various ethers may be used also but in such a case there are obtained mixtures of products which may be separated, however, by conventional techniques, such as fractional distillation.

The organic halides employed according to this invention are the unsubstituted and substituted hydrocarbon halides, such as the alkyl, including both acyclic and alicyclic, and aromatic halides, preferably having less than fifteen carbon atoms per molecule. The substituted alkyl halides are preferably those in which one or more hydrogen atoms is substituted by a corresponding number of radicals selected from the group consisting of the halogens, nitro group, cyano group, aryl groups, and sulfone group. The aromatic halides are those in which the halogen atom is activated by the presence of a nitro group, preferably at least two in the ortho and para positions of the aromatic ring. The following compounds are given as examples of suitable organic halides which may be used by this novel process and are in no way to be construed as limiting the scope of this invention: methyl chloride, methylene dichloride, ethyl bromide, isopropyl chloride, isoamyl chloride, cyclopentyl chloride, chloromethyl nitrile, hexachlorocyclohexane, tetradecyl chloride, carbon tetrachloride, trichloromethyl bromide, 1,1-difluoro-1-chloro-2,2,2-trichloroethane, cyclohexyl bromide, hexachlorohexane, methyl iodide, benzyl iodide, isopropyl fluoride, fluorobenzo dichloride, 2-cyano-1-chloroethane, 2-nitropropyl chloride, trichlorocyanopropane, nitrotrichloromethane, benzyl chloride, 2-4-dinitrochlorobenzene, para-nitrochlorobenzene, 2,4-dinitrobromobenzene, phenyl β-chloropropyl sulfone, and phenyl β-chloroethyl sulfone. Mixtures of different organic halides may be used in accordance with this invention and in such case mixtures of products will be obtained. Although any of the halogens are suitable as the halogen of the organic halide, the gaseous halogens are preferred and chlorine has been found to be the most preferable and the more economical of the halogens. The alkyl halides may be prepared in conventional manner known to those skilled in the art.

Both inorganic and organic trivalent phosphorus halides may be used as the phosphorus halide reactant of the present invention. Typical examples of inorganic trivalent phosphorus halides are as follows: phosphorus trifluoride, phosphorus trichloride, phosphorus tribromide and phosphorus triiodide; mixed phosphorus halides, such as difluorophosphorus chloride, difluorophosphorus iodide, dichlorophosphorus fluoride, chlorobromophosphorus fluoride and dichlorophosphorus bromide; and diphosphorus tetraiodide. The preferred organic trivalent phosphorus halides which may be used in accordance with this invention are the hydrocarbon phosphorus halides having only a continuous carbon skeleton of not more than 15 carbon atoms, such as the acyclic and alicyclic alkyl phosphorus halides, either substituted or unsubstituted, and the aromatic phosphorus halides, either substituted or unsubstituted. In general, the organic radical of the organic phosphorus halide is selected from the same classes as the organic halides previously discussed, and may be the same or different than the organic radical of the organic halide. Typical examples of organic phosphorus halides are methyl phosphorus dichloride, ethyl phosphorus difluoride, isopropyl phosphorus dichloride, benzyl phosphorus dichloride, phenyl phosphorus diiodide, diphenyl phosphorus chloride, diphenyl phosphorus bromide, 4-nitrophenyl phosphorus dibromide, 4-bromophenyl phosphorus dichloride, di(4-nitrophenyl) phosphorus chloride, methyl ethyl phosphorus chloride, methyl ethyl phosphorus bromide, diethyl phosphorus bromide, dibenzyl phosphorus chloride, dipropyl phosphorus chloride, cyclohexyl phosphorus dichloride, cyclopentyl phosphorus dibromide, beta-chlorooctyl phosphorus dichloride and cyclooctyl bromo phosphorus chloride. The halogen of the trivalent phosphorus halide may be any of the halogens, preferably the gaseous halogens, such as chlorine, without departing from the scope of the invention.

Alkoxy phosphorus halides having the general formulae $R'O—PX_2$ and $(R'O)_2PX$ may also be used as a reactant in accordance with this invention. Such alkoxy phosphorus halides are used in addition to one or more of the above type of trivalent phosphorus halide. When using organic phosphorus halides in which there is present one or more phosphorus to carbon bonds, such bonds remain intact during the course of the reactions described herein and each of the organic radicals may be present in the final product. When alkoxy phosphorus halides are employed, the oxygen to phosphorus bond is cleaved during the course of the reaction and the final product will not contain the R'O-radicals as such. Thus in order to obtain the maximum utilization of such alkoxy phosphorus halides it is preferable for the organic group of the R'O-radical to be the same as the organic group of the organic halide reactant. Typical examples of such alkoxy phosphorus halides are methoxy phosphorus dichloride, ethoxy phosphorus dibromide and dimethoxy phosphorus chloride.

The particular trivalent phosphorus halide employed depends upon the ultimate product desired. When producing an organic phosphonyl dihalide

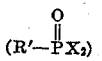

an inorganic phosphorus trihalide ($PX_3$), or a trivalent organic phosphorus halide of the above classes, is employed. When producing an organic phosphonyl monohalide, such as methyl phenyl phosphonyl chloride, an organic phosphorus dihalide, such as phenyl phosphorus dichloride is employed. Further when producing a phosphine oxide in which the three organic radicals may or may not be the same, an organic phosphorus monohalide of the type $R'_2PX$ (wherein the R's may or may not be the same, and may or may not be the same as the R' radical of the organic ether and organic halide reactants) is used.

The aliphatic and aromatic phosphorus halides may be prepared by reacting a phosphorus trihalide, such as the trichloride, with a dialkyl, dicycloalkyl, or diacyl mercury derivative at a temperature of 180° C. to 230° C. The dihalides are first produced and by continuing the heating for a further length of time the monohalide may be produced and recovered. The aromatic phosphorus halides may also be produced by reacting an aromatic hydrocarbon with a phosphorus trihalide in the presence of a Friedel-Crafts catalyst, such as aluminum chloride.

Although the yield of organophosphorus compound produced by the reaction which comprises reacting an organic halide, an organic ether and a trivalent phosphorus halide is satisfactory, the yield of organophosphorus compound produced may be substantially increased by the presence in the reaction mixture of a compound containing a phosphoryl group. The exact mechanism of the reaction described herein is not known. It is postulated without limiting the invention, however, that when a compound containing a phosphoryl group is used in accordance with this invention it is serving as one of the sources of oxygen in the final product. In view of this, therefore, a wide variety of compounds containing the phosphoryl group may be used in accordance with this invention, including both inorganic and organic phosphoryl compounds. The preferred phosphoryl compounds are the inorganic phosphoryl trihalides

$(P-X_3)$

Typical examples of suitable phosphoryl trihalides are phosphoryl trifluoride, phosphoryl trichloride, phosphoryl tribromide and the mixed phosphoryl trihalides, such as bromo phosphoryl dichloride, dichloro phosphoryl fluoride and iodo phosphoryl dichloride. Examples of organic phosphoryl compounds which give satisfactory yields of product are chloromethane phosphonyl dichloride, diethyl phosphonyl chloride, benzene phosphonyl dichloride and organic phosphates, such as trimethyl phosphate. Phosphoryl trichloride and phosphoryl tribromide have been found to be the more economical and convenient of the various phosphoryl compounds which may be employed.

The organic phosphonyl halide reactants may be produced by reacting the corresponding phosphonic acid with phosphorus pentahalide, such as the pentachloride, at room temperature. Aliphatic phosphonyl halides having at least 5 carbon atoms may also be produced by reacting an aliphatically bound hydrogen atom of a hydrocarbon with phosphorus trihalide, such as the trichloride, by blowing free oxygen through the reaction mixture at room temperature.

In general the organic reactants may include as much as 15 carbon atoms in the molecule and in a single chain, preferably, however, the number of carbon atoms per molecule and in a single carbon chain is not more than 8.

The total catalyst mixture is generally employed in an amount between about 0.01 mole and about 1.5 moles per mole of trivalent phosphorus halide. Preferably, between about 0.02 mole and about 0.5 mole of total catalyst mixture is employed per mole of trivalent phosphorus halide. Usually no more than about 0.1 mol of the iodine component per mole of phosphorus halide is required and the amount may be as low as 0.002 mol per mole of phosphorus halide. Small amounts of phosphorus triiodide and methyl iodide, although classed as reactants may act as catalysts when other reactants are used as the principal reactants. The mole ratio of the iodine component to the metal phosphorus trihalo complex of the catalyst is between about 1:100 and about 1:1; preferably 1:25 to 1:2.

The amount of phosphoryl compound which may be employed is not critical to the production of phosphonyl halides and phosphine oxides as described herein. The mole ratio of phosphoryl compound to trivalent phosphorus halide may vary over a relatively wide range, such as between 0 and about 5. When a phosphoryl compound is employed the preferable range is between about 0.2 mole and about 2 moles of phosphoryl compound per mole of trivalent phosphorus halide. Although amounts of phosphoryl compound in excess of 5 moles may be used without seriously interfering with the formation of the desired organophosphorus compounds, the use of such excessive amounts of this reactant is not necessary and may only add to the cost of production of desired products.

Generally the mole ratio of the organic ether reactant with respect to the trivalent phosphorus halide reactant will range from about 0.1 and about 0.8 or about 1.0. Similarly the mole ratio of the organic halide reactant with respect to the trivalent phosphorus halide can vary over a relatively wide range when producing phosphonyl halides and phosphine oxides according to the present invention. In general the organic halide may be employed in an amount equal to about 0.1 mole to about 4.0 moles per mole of trivalent phosphorus halide, the preferable amount being between about 0.2 mole and about 2.5 moles of organic halide per mole of trivalent phosphorus halide.

As stated previously organic phosphonyl halides and organic phosphine oxides may be produced by the reaction between an organic halide, an organic ether and a trivalent phosphorus halide in the absence of a phosphoryl compound as illustrated by the following typical general reactions wherein only the chief reaction product is shown:

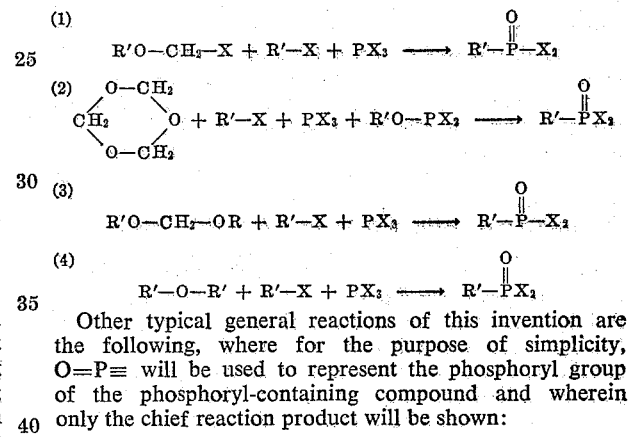

Other typical general reactions of this invention are the following, where for the purpose of simplicity, $O=P\equiv$ will be used to represent the phosphoryl group of the phosphoryl-containing compound and wherein only the chief reaction product will be shown:

(5)
$$R'-O-CH_2-X + R'-X + PX_3 + \equiv P=O \longrightarrow R'-\overset{O}{\underset{\|}{P}}-X_2$$

(6)
$$R'-O-CH_2-X + R'-X + R''PX_2 + \equiv P=O \longrightarrow R'R''-\overset{O}{\underset{\|}{P}}X$$

(7)
$$R'-O-R' + R'-X + R''R'''PX + \equiv P=O \longrightarrow R'R''R'''P=O$$

The R', R'' and R''' groups in the chemical formulas shown above represent organic radicals as previously discussed and may be the same or different, and X represents a halogen atom (Cl, F, Br and I).

The following equation for the production of methane phosphonyl dichloride by the reaction between chloromethyl methyl ether, methyl chloride, phosphorus trichloride and phosphoryl trichloride is cited as a typical specific example and is not to be construed as limiting the scope of the present invention:

(8)
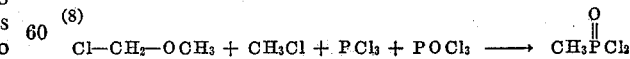

The process of this invention may be conducted in batchwise or continuous systems, or as a stepwise reaction. When a catalyst is employed the reaction of the process described herein may be conducted as a multi-stage reaction, but preferably as a two-stage reaction. The first stage is the reaction of an organic ether, an organic halide and a trivalent phosphorus halide with or without the addition of a phosphoryl compound in the presence of the catalyst mixture of the present invention. The second and subsequent stages are the reaction of the total crude product obtained in the first step with additional amounts of the same reactants with or without the addition of more catalyst mixture. In so conducting the reaction in this stepwise manner improved yields of phosphonyl halides and phosphine oxides are obtained by using smaller amounts of catalyst mixture as compared to the amount of catalyst mixture needed when the reaction is conducted as a one-step reaction.

The process of the present invention is operative at a temperature between about room temperature (20° C.) and the decomposition temperature of the reactants. Generally the temperature of the reaction will be below about 300° C. The reaction may be effected at elevated temperatures by introducing the individual reactants, either separately or together, into a reaction zone, such as a steel bomb, and carrying out the reaction under autogenous conditions of pressure as a matter of convenience. The preferred temperature range is between about 150° C. and about 275° C. The time of reaction may vary over relatively wide limits, such as between about 10 minutes and about 20 hours, but the preferable contact time or residence has been found to be between about 1 and about 15 hours.

Any free iodine which may be present upon completion of the reaction is conveniently separated by treating the crude product with mercury, followed by removal of the mercury salts. The products of the reaction are further purified by conventional methods, such as distillation or crystallization of solid products depending upon the physical nature of the products. Liquid products may be separated as almost one hundred percent pure by efficient fractional distillation. The phosphonyl halides may be isolated as such or may be hydrolyzed to the corresponding phosphonic acids which may then be converted to various ester derivatives, or the phosphonyl halides may be converted directly to a desired type ester by conventional methods. These derivatives have many known uses to those skilled in the art as previously discussed. The products are identified by the usual methods, such as determination of boiling point and other such physical properties, determination of infrared absorption spectra, percent composition analysis, mass spectrometer analysis, etc.

The reaction may be effected in the presence of liquid diluents or solvents, such as benzene, nitrobenzene, toluene and hexane, in which the reactants are dissolved or dispersed by mechanical agitation or by conventional emulsifying agents.

It is to be understood that the choice of temperature of reaction, contact time, molar quantities of reactants and catalyst mixture to be preferred in any instance will depend upon the starting materials employed and the result desired, and that the procedure employed for the isolation and purification of desired products will be dependent upon the physical nature of the products. Although the theory and mechanism of reaction is believed to be correct, other theories may explain the reaction of the present invention, and the theories advanced herein are not to be construed as an unnecessary limitation on the invention.

The following examples are offered as a better understanding of the present invention, but the examples are not to be considered as unnecessarily limiting the present invention:

Example 1

A 200 ml. steel bomb was charged with 23 ml. (0.3 mole) of chloromethyl methyl ether, 33.2 grams (0.66 mole) of methyl chloride, 70 ml. (0.9 mole) of phosphorus trichloride, 27 ml. (0.3 mole) of phosphoryl trichloride and 46.9 grams (0.15 mole) of nickel iodide. The bomb was then closed, placed in a reciprocating shaker and heated to 250° C. and held at this temperature for a period of 7 hours. After cooling, the bomb was vented to atmospheric pressure. The total crude product in the bomb was transferred to a distilling flask and heated at atmospheric pressure. Two liquid fractions were obtained: the first fraction had a boiling point of 41° C. to 121° C.; the second fraction had a boiling point of 121° C. to 183° C. The low boiling fraction was freed of iodine by shaking with mercury followed by removal of the mercury salts by filtration; this fraction was found to be chiefly unreacted starting compounds. The high boiling fraction was diluted with purified chloroform, shaken with mercury and filtered to remove the mercury salts. After removal of the chloroform from the high boiling fraction this fraction was further purified by distillation at atmospheric pressure. A liquid fraction weighing 60.4 grams and having a boiling point of 140° C. to 165° C. contained 50.1 grams of methane phosphonyl dichloride as determined by mass spectrometer analysis.

Example 2

When the run of Example 1 is carried out using 0.03 mole of a total catalyst mixture of about 0.005 mole of nickel iodide and about 0.05 mole of nickel tetrakistrichlorophosphine a better yield and selectivity of methane phosphonyl dichloride is observed.

Phosphine oxides and other organic phosphonyl halides which may be produced in accordance with the foregoing description and examples are: trimethyl phosphine oxide, tripropyl phosphine oxide, dimethyl ethyl phosphine oxide, methyl diphenyl phosphine oxide, methyl ethyl phenyl phosphine oxide, methyl phenyl benzyl phosphine oxide, dimethyl phosphonyl chloride, methyl ethyl phosphonyl chloride, dipropyl phosphonyl chloride, ethyl phenyl phosphonyl chloride, methyl phenyl phosphonyl chloride, dimethyl phosphonyl bromide, methyl ethyl phosphonyl bromide, 2-chloroethane phosphonyl dichloride, cyclohexane phosphonyl dichloride, tertiary butane phosphonyl dichloride and 2-chloroethane phosphonyl dibromide.

This invention relates to a process of interacting an organic halide, a trivalent phosphorus halide and an organic ether in any sequence of steps in single or multiple reaction zones and various modifications and alterations of procedure and operating conditions may become apparent to those skilled in the art without departing from the scope of this invention.

Having described my invention, I claim:

1. A process which comprises reacting a phosphorus trihalide, an alkyl halide having not more than 15 carbon atoms per molecule, and an alkyl ether wherein the radicals attached to ether oxygen contain not more than 10 carbon atoms per radical and wherein ether oxygen is bonded to an alkyl group and is additionally bonded to a member of the group consisting of an unsubstituted alkyl radical and a haloalkyl radical, in the presence of a catalyst mixture comprising a metal iodide and a metal phosphorus trihalo complex having the formula $M(PX_3)_n$ wherein X is halogen, M is a metal selected from the group consisting of group VI and VIII metals of the periodic table and wherein $n$ is an integer equal to at least twice the minimum valence of M, at a temperature between about 20° C. and about 300° C. to produce an organic phosphonyl halide.

2. The process of claim 1 in which the metal iodide of said catalyst mixture is nickel iodide.

3. The process of claim 1 in which the metal iodide of said catalyst mixture is zinc iodide.

4. The process of claim 1 in which the metal iodide of said catalyst mixture is cobalt iodide.

5. The process of claim 1 in which the metal phosphorus trihalo complex of the catalyst mixture is a group VIII metal trihalo phosphine complex.

6. The process of claim 1 in which the metal phosphorus trihalo complex of the catalyst mixture is nickel tetrakistrichlorophosphine.

7. The process of claim 1 in which the metal phosphorus trihalo complex of the catalyst mixture is cobalt tetrakistrichlorophosphine.

8. The process of claim 1 in which the metal phosphorus trihalo complex of the catalyst mixture is nickel tetrakistribromophosphine.

9. The process of claim 1 in which the metal phosphorus trihalo complex of the catalyst mixture is nickel tetrakistrifluorophosphine.

10. The process of claim 1 in which the metal phosphorus trihalocomplex of the catalyst mixture is iron pentatrichlorophosphine.

11. A process for the production of an alkane phosphonyl dichloride which comprises reacting phosphorus trichloride, an alkyl chloride having not more than fifteen carbon atoms in the alkyl group, and a saturated mono alpha-halogenated dialkyl ether having not more than ten carbon atoms in each of the alkyl groups in the presence of a catalyst mixture comprising a metal iodide and nickel tetrakistrichlorophosphine at a temperature between about 150° C. and about 275° C. for a residence time between about 1 and about 15 hours such that an alkane phosphonyl dichloride is produced, and recovering the alkane phosphonyl dichloride as a product of the process.

12. A process for the production of methane phosphonyl dichloride which comprises reacting phosphorus trichloride, methyl chloride and alpha-chloromethyl methyl ether in the presence of a catalyst mixture comprising a metal iodide and nickel tetrakistrichlorophosphine at a temperature between about 150° C. and about 275° C. for a residence time between about 1 and about 15 hours such that methane phosphonyl dichloride is produced, and recovering the methane phosphonyl dichloride as a product of the process.

13. The process of claim 12 in which the metal iodide of said catalyst mixture is nickel iodide.

14. A process which comprises reacting a phosphorus trihalide, an alkyl halide having not more than 15 carbon atoms per molecule, and an alpha-halogenated dialkyl ether having not more than ten carbon atoms in each alkyl group bonded to ether oxygen, in the presence of a metal iodide and a metal phosphorus trihalo complex having the formula $M(PX_3)_n$ wherein X is halogen, M is a metal selected from the group consisting of group VI and group VIII metals of the periodic table, and $n$ is an integer equal to at least twice the minimum valence of M, at a temperature between about 150° C. and about 275° C. to produce an organic phosphonyl dihalide.

References Cited in the file of this patent

UNITED STATES PATENTS

| | | |
|---|---|---|
| 2,146,584 | Lipkin | Feb. 7, 1939 |
| 2,252,675 | Prutton et al. | Aug. 12, 1941 |
| 2,276,492 | Jolly et al. | Mar. 17, 1942 |
| 2,489,917 | McCombie et al. | Nov. 29, 1949 |
| 2,500,022 | Brown | Mar. 7, 1950 |
| 2,683,168 | Jensen et al. | July 6, 1954 |

OTHER REFERENCES

Webster's New International Dictionary, 2nd ed., Unabridged (1950), page 546.

Kosolapoff: Organo-phosphorus Compounds (August 1950), pages 48 and 62.